US010901229B2

(12) United States Patent
Miller

(10) Patent No.: US 10,901,229 B2
(45) Date of Patent: Jan. 26, 2021

(54) SYSTEMS AND METHODS OF PROVIDING VISUAL INFORMATION WITH ONE DIMENSIONAL PUPIL EXPANSION

(71) Applicant: Microsoft Technology Licensing, LLC, Redmond, WA (US)

(72) Inventor: Joshua Owen Miller, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 128 days.

(21) Appl. No.: 15/986,512

(22) Filed: May 22, 2018

(65) Prior Publication Data

US 2019/0361256 A1 Nov. 28, 2019

(51) Int. Cl.
| G02B 27/42 | (2006.01) |
| G02B 26/10 | (2006.01) |
| G02B 27/00 | (2006.01) |
| G02B 27/01 | (2006.01) |
| G06F 3/01 | (2006.01) |

(52) U.S. Cl.
CPC ......... G02B 27/4205 (2013.01); G02B 26/10 (2013.01); G02B 27/0081 (2013.01); G02B 27/0172 (2013.01); G06F 3/013 (2013.01); G02B 2027/0112 (2013.01); G02B 2027/0123 (2013.01); G02B 2027/0178 (2013.01)

(58) Field of Classification Search
CPC ............ G02B 27/4205; G02B 27/0081; G02B 27/0172; G02B 26/10; G02B 2027/0112; G02B 2027/0123; G02B 2027/0178; G06F 3/013
USPC ........................................................ 359/567
See application file for complete search history.

(56) References Cited

U.S. PATENT DOCUMENTS

| 9,715,067 | B1 | 7/2017 | Brown et al. | |
| 10,157,559 | B2* | 12/2018 | Chi | G02B 27/141 |
| 10,191,283 | B2* | 1/2019 | Alexander | G02B 27/0081 |
| 10,338,384 | B2* | 7/2019 | Tremblay | G02B 27/0172 |
| 10,444,507 | B2* | 10/2019 | Urey | A61B 3/032 |
| 10,481,317 | B2* | 11/2019 | Peroz | G02B 27/017 |
| 10,534,177 | B1* | 1/2020 | Chi | G02B 6/0035 |
| 2010/0277803 | A1* | 11/2010 | Pockett | G02B 27/0172 359/567 |

(Continued)

FOREIGN PATENT DOCUMENTS

WO 2018184718 A1 10/2018

OTHER PUBLICATIONS

"International Search Report and Written Opinion Issued in PCT Application No. PCT/US2019/030979", dated Aug. 20, 2019, 13 Pages.

*Primary Examiner* — Collin X Beatty
(74) *Attorney, Agent, or Firm* — Ray Quinney & Nebeker P.C.; John O. Carpenter

(57) ABSTRACT

A display system includes a waveguide having a first diffractive optical element and a second diffractive optical element. The waveguide is configured to receive a display light having a pupil height and pupil width and transmit the display light to an eyebox with an eyebox height and an eyebox width. The first diffractive optical element is configured to in-couple the display light into the waveguide, the first diffractive optical element having a first diffractive optical element height that is at least the pupil height and a first diffractive optical element width that is at least the eyebox width.

20 Claims, 5 Drawing Sheets

(56) References Cited

U.S. PATENT DOCUMENTS

| | | | |
|---|---|---|---|
| 2011/0019874 A1* | 1/2011 | Jarvenpaa | A61B 3/113 |
| | | | 382/103 |
| 2012/0127577 A1* | 5/2012 | Desserouer | G02B 27/0101 |
| | | | 359/566 |
| 2014/0140654 A1* | 5/2014 | Brown | G02F 1/29 |
| | | | 385/10 |
| 2018/0130391 A1 | 5/2018 | Bohn | |
| 2018/0284884 A1* | 10/2018 | Sulai | G06F 3/013 |
| 2019/0086598 A1* | 3/2019 | Futterer | G02B 6/0031 |

* cited by examiner

SYSTEMS AND METHODS OF PROVIDING VISUAL INFORMATION WITH ONE DIMENSIONAL PUPIL EXPANSION

BACKGROUND

Background and Relevant Art

Augmented reality (AR) and mixed reality (MR) display systems allow a user to experience visual information presented from a computer simultaneously with ambient light from the user's surroundings. One method for allowing a user to view their surroundings while receiving additional visual information introduced in their field of view is a waveguide. A waveguide allows ambient light to reach a user's eyes, while also allowing light from a display device to be directed to the user's field of view and combined with the ambient light.

Visual information is displayed on the waveguide by directing display light through the waveguide. The display light may be generated by a light source and then in-coupled to the waveguide. Conventionally, the pupil of the display light is subsequently expanded in two dimensions through a series of expansion gratings. The resulting eyebox provide output light to the user's eye over a large area. However, due to the large size of the eye box, much light is also directed outside of the viewers eye location and effectively reduces the efficiency of the light transmission from the light source to the eye. Furthermore, the series of expansion gratings requires tight manufacturing tolerances and may limit the flexibility of the design of the waveguide and associated optics.

BRIEF SUMMARY

In some embodiments, a display system includes a waveguide having a first diffractive optical element and a second diffractive optical element. The waveguide is configured to receive a display light having a pupil height and pupil width and transmit the display light to an eyebox with an eyebox height and an eyebox width. The first diffractive optical element is configured to in-couple the display light into the waveguide, the first diffractive optical element having a first diffractive optical element height that is at least the pupil height and a first diffractive optical element width that is at least the eyebox width.

In other embodiments, a display system includes an eye-tracking device, a selectively directable light source, and a waveguide. The eye-tracking device is configured to measure a pupil position. The selectively directable light source is configured to provide a display light having a pupil height and pupil width, and the light source is selectively directable based on the pupil position. The waveguide is configured to receive the display light and transmit the display light. The waveguide includes a first diffractive optical element configured to in-couple the display light into the waveguide and a second diffractive optical element configured to out-couple the display light from the waveguide in a one-dimensional eyebox. The first diffractive optical element has a first diffractive optical element height that is at least the pupil height and a first diffractive optical element width that is at least five times the pupil height.

In yet other embodiments, a method of providing visual information to a user includes in-coupling a display light into a waveguide at a first lateral position along a first diffractive optical element, reflecting the display light within the waveguide to a second optical element, and out-coupling the display light in a first one-dimensional eyebox.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for providing visual information to a user. More specifically, the present disclosure relates to directing a display light into, through, and out of a waveguide to provide visual information to a user. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a light engine to the user's field of view. The waveguide may guide the display light before out-coupling the light. Upon out-coupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes.

Figure 1:
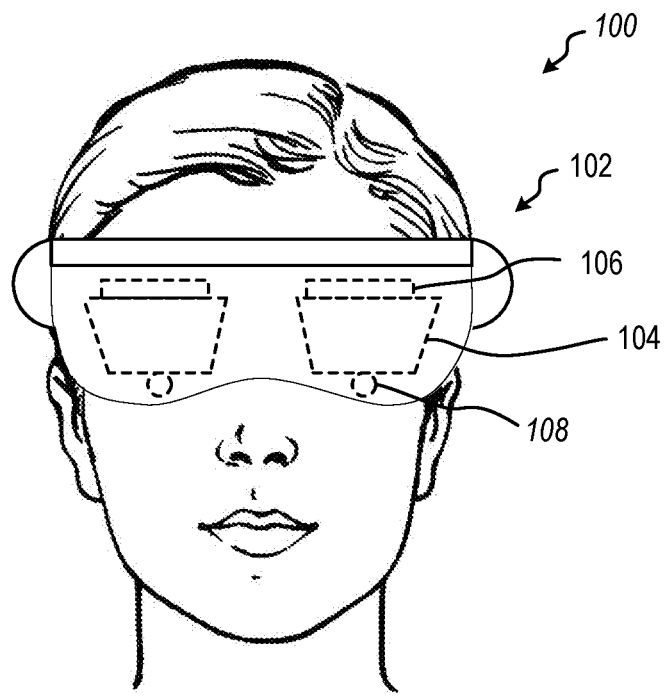
FIG. 1 is a perspective view of a head-mounted display (HMD) including a waveguide, according to at least one embodiment of the present disclosure.

FIG. 1 is a perspective view of a user 100 wearing a HMD 102. In some embodiments, the HMD 102 may have a waveguide 104 positioned near the user 100 to direct visual information to the user 100. The HMD 102 may include a single waveguide 104, a separate waveguide 104 for each of the user's eyes (i.e., two waveguides 104), or more than two waveguides 104 to provide visual information over a larger field of view.

In some embodiments, the waveguide 104 may include surface relief gratings (SRG) or other diffractive optical elements (DOE) to extract the visual information from the total internal reflection of the waveguide 104. The SRG may out-couple visual information that is provided to the waveguide 104 by one or more electronic components of the HMD 102. In some embodiments, the HMD 102 may include one or more processors, storage devices, power supplies, audio devices, display devices, cameras, communication devices, or combinations thereof, that receive, collect, store, process, or calculate information that is provided to the user. For example, a light engine 106 may be positioned optically adjacent the waveguide(s) to provide visual information to the waveguide(s) 104.

In some embodiments, the HMD 102 may further include an eye-tracking device 108 positioned in the HMD 102 to track a direction of the user's pupil location. In other words, the eye-tracking device 108 may image the user's pupil, iris, other portions of the user's eye, or combinations thereof to calculate the position of the user's eye and/or the direction the user is looking. In some embodiments, the eye-tracking device 108 may measure and/or calculate the x- and y-components of the user's pupil location and x- and y-components of the direction the user is looking. In other embodiments, the eye-tracking device 108 may measure and/or calculate only the x-component (i.e., the lateral component) of the user's pupil location and x-component of the direction the user is looking. While the examples described herein may utilize a horizontal input diffractive optical element, it should be understood that any references to "width" and "height", "vertical" and "horizontal", "up" and "down", "left" and "right", or other relative directional descriptors are intended to be relative to the described reference frame. While the embodiments described herein may in-couple light at a top of the waveguide 104, in other embodiments, a light engine 106 may be positioned on a side or bottom of the waveguide 104 and/or light may be in-coupled from a direction other than that explicitly described and illustrated.

Figure 2:
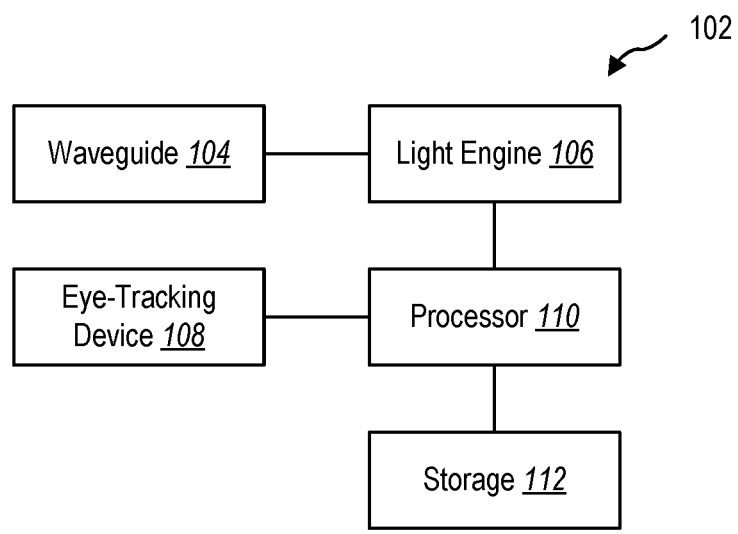
FIG. 2 is a schematic representation of the HMD of FIG. 1, according to at least one embodiment of the present disclosure.

FIG. 2 is a schematic representation of the HMD 102 including the waveguide in optical communication with the light engine 106. The light engine 106 and eye-tracking device 108 may be in data communication with a processor 110. The processor 110 may further be in data communication with a storage device 112. The storage device 112 may be a hardware storage device, such as a platen-based storage device, a solid-state storage device, or other non-transitory or long-term storage device. In other embodiments, the storage device 112 may be a remote storage device, such as a cloud storage system, in communication with the processor 110. For example, the processor 110 may communicate with the storage device through a wired connection, such as an ethernet connection; a wireless connection, such as WIFI, BLUETOOTH, cellular data networks, or other wireless data communication; other near field communications, or any other communication devices.

Figure 3:
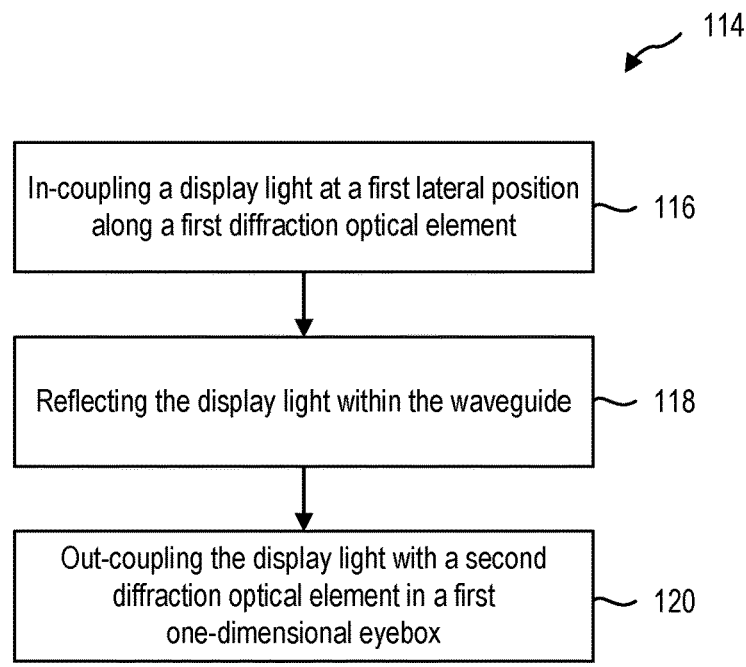
FIG. 3 is a flowchart illustrating a method of providing visual information to a user, according to at least one embodiment of the present disclosure.

FIG. 3 is a flowchart illustrating a method 114 of providing visual information to a user. In some embodiments, the method may include in-coupling a display light into the waveguide at a first lateral position along a first diffractive optical element at 116. In some examples, the display light may be scanned, reflected toward, focused toward, or otherwise directed at the first lateral position in either a continuous sweep or scan across a width of the first diffractive optical element. In other examples, the display light may be selectively directed at the first lateral position by relay optics or by the selection of one of a plurality of light sources positioned in an array along the width (i.e., in the lateral direction) of the first diffractive optical element. In such examples, the first lateral position may be selected based upon a pupil position measured by the eye-tracking device.

In some embodiments, the method 114 may further include reflecting the display light within the waveguide to a second optical element at 118 and out-coupling the display light in a first one-dimensional eyebox using the second diffractive optical element at 120. The display light may be reflected within the waveguide directly to the second optical element without an intervening expansion, diffraction, or other optical changes to the display light.

Figure 4:
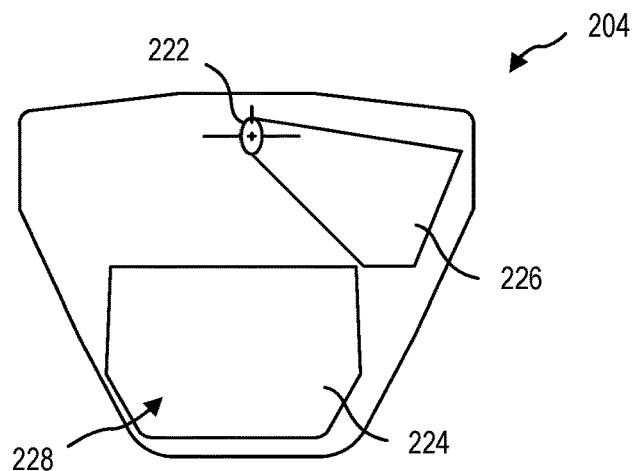
FIG. 4 is a front view of a waveguide replicating the pupil into a 2-dimension eyebox.

FIG. 4 is a front view of a waveguide with multi-dimension pupil expansion 204. The waveguide with multi-dimension pupil expansion 204 receives a display light at an in-coupling diffractive optical element 222 and out-couples the light at an out-coupling diffractive optical element 224. The in-coupling diffractive optical element 222 is conventionally sized to approximately the area of the display light pupil from a light source. The display light is directed through an expansion optical element 226 to expand the pupil of the display light (as provided to the waveguide 204) in a first direction. The out-coupling diffractive optical element 224 then expands the display light pupil in a second direction orthogonal to the first direction to create a two-dimensional eyebox 228 that is substantially the same area as the out-coupling diffractive optical element 224.

The two-stage two-dimensional expansion of the display light pupil, also known as the display eyebox, requires additional manufacturing steps compared to a one-dimensional expansion waveguide, tighter manufacturing tolerances to avoid optical aberrations and errors, and limit the design flexibility (and associated packaging within a HMD or other display system) of the waveguide and display system.

FIG. 5 through FIG. 9 illustrate example embodiments of waveguides and display systems that may be used to perform the method described in relation to FIG. 3 or other methods of providing visual information to a user. At least one embodiment of a waveguide and display system according to the present disclosure may be simpler and/or cheaper to manufacture than a waveguide with multi-dimension pupil expansion, may be more reliable over an operational lifetime than a waveguide with multi-dimension pupil expansion, may have improved optical performance relative to a waveguide with multi-dimension pupil expansion, or may have other benefits relative to a waveguide with multi-dimension pupil expansion.

Figure 5:
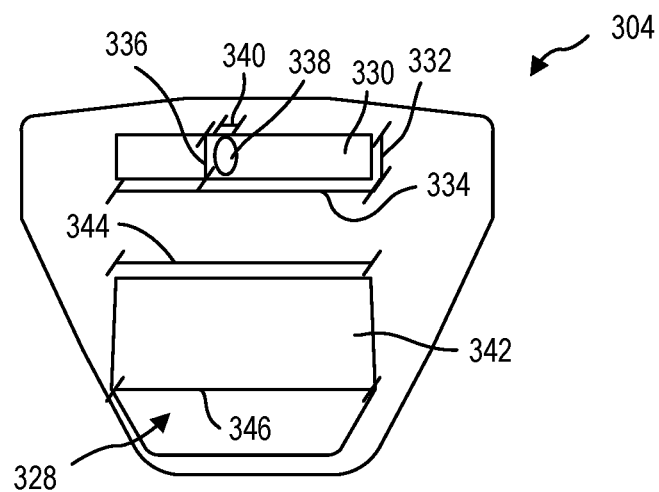
FIG. 5 is a front view of a waveguide having a waveguide input coupler and and output coupler where the output coupler also may replicate the pupil in a single dimension, according to at least one embodiment of the present disclosure.

FIG. 5 is a front view of an embodiment of a waveguide 304 having a "wide" first diffractive optical element for in-coupling display light into the waveguide 304, according to the present disclosure. In some embodiments, the first diffractive optical element 330 may include a surface relief grating (SRG), coupled prism, or other in-coupling element to in-couple a display light into the waveguide 304. The first diffractive optical element 330 may have a first diffractive optical element height 332 and a first diffractive optical element height 334.

In some embodiments, the first diffractive optical element 330 may have a first diffractive optical element height 332 that is approximately a pupil height 336 of an input pupil 338 of the display light. In other embodiments, the first diffractive optical element 330 may have a first diffractive optical element height 332 that is at least the pupil height 336. In yet other embodiments, the first diffractive optical element 330 may have a first diffractive optical element height 332 that is less than the pupil height 336.

In some embodiments, the first diffractive optical element 330 may have a first diffractive optical element width 334 that is larger than a pupil width 340 of the input pupil 338. For example, the first diffractive optical element width 334 may be a multiple of the pupil width 340 in a range having an upper value, a lower value, or upper and lower values including any of 5, 6, 7, 8, 9, 10, 12, 15, 20, 25, 30, 40, 50, or any values therebetween. In some examples, the first diffractive optical element width 334 may be at least 5 times the pupil width 340. In other examples, the first diffractive optical element width 334 may be less than 50 times the pupil width 340. In yet other examples, the first diffractive optical element width 334 may be between 5 and 50 times the pupil width 340. In further examples, the first diffractive optical element width 334 may be between 8 and 25 times the pupil width 340. In at least one example, the first diffractive optical element width 334 may be about 12 times the pupil width 340.

In some embodiments, the first diffractive optical element 330 may have a first diffractive optical element width 334 and a first diffractive optical element height 332 that define a first diffractive optical element aspect ratio (first diffractive optical element width 334 to first diffractive optical element height 332). The first diffractive optical element aspect ratio may be in a range having an upper value, a lower value, or upper and lower values including any of 5, 6, 7, 8, 9, 10, 12, 15, 20, 25, 30, 40, 50, or any values therebetween. In some examples, the first diffractive optical element aspect ratio may be at least 5. In other examples, the first diffractive optical element aspect ratio may be less than 50. In yet other examples, the first diffractive optical element aspect ratio may be between 5 and 50. In further examples, first diffractive optical element aspect ratio may be between 8 and 25. In at least one example, the first diffractive optical element aspect ratio may be about 10.

The waveguide 304 may further include a second diffractive optical element 342 for out-coupling display light from the waveguide 304, according to the present disclosure. In some embodiments, the second diffractive optical element 342 may include a surface relief grating (SRG), coupled prism, or other optical element to out-couple a display light from the waveguide 304.

In some embodiments, the second diffractive optical element 342 may define the eyebox 328 of the waveguide 328. In other embodiments, the eyebox 328 may be smaller than the second diffractive optical element 342. For example, the eyebox width 346 may be defined by the smaller of the second diffractive optical element width 344 or the first diffractive optical element width 334. The eyebox 328 may be formed by the expansion and out-coupling of the display light by the second diffractive optical element 342. The display light received at the second diffractive optical element 342 may be determined, at least in part, by the display light provided to and in-coupled by the first diffractive optical element 330.

Figure 6:
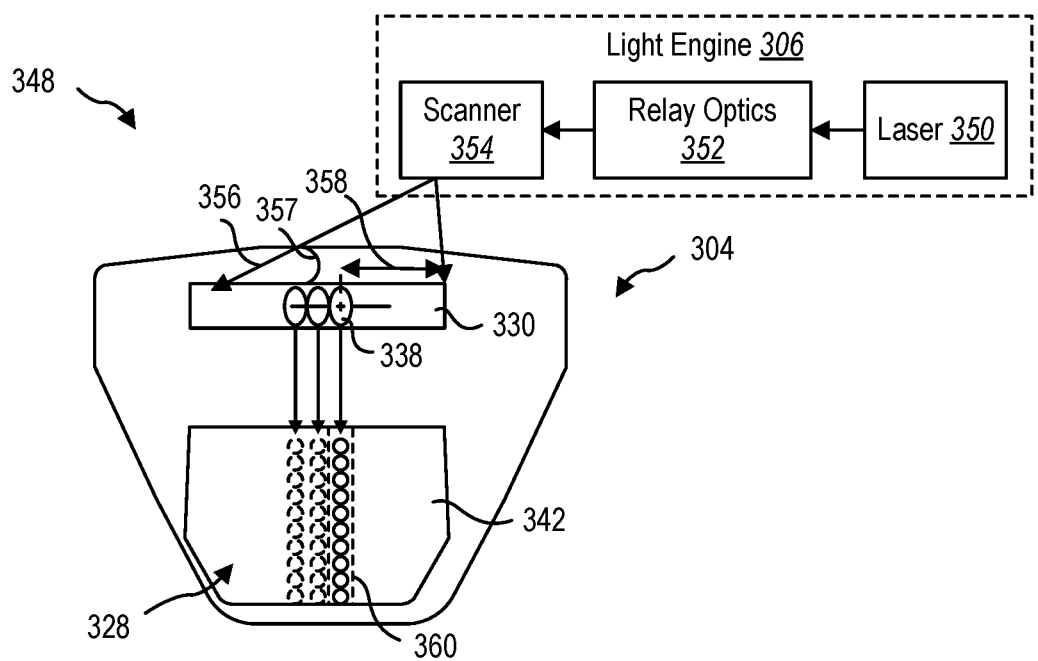
FIG. 6 is a schematic representation of a display system including the waveguide of FIG. 5 with continuous scanning pupil input, according to at least one embodiment of the present disclosure.

FIG. 6 is a schematic representation of a display system 348 including a light engine 306 in optical communication with a waveguide 304 of FIG. 5. The light engine 306 may include a laser light source 350 that provides at least one color of display light 356. For example, the laser light source 350 may be provide a laser display light with an emission spectrum width of less than 2 nanometers to limit wavelength dispersion in the display system 348. In yet other examples, the laser light source 350 may be provide a laser display light with an emission spectrum width of less than 1 nanometer. In yet other examples, the laser light source 350 may be provide a laser display light with an emission spectrum width of less than 0.5 nanometers. In other embodiments, the laser light source 350 may be a plurality of laser light sources to provide, for example, RGB display light 356. The light engine 306 may include other light sources in addition to, or alternative to, the laser light source 350, such as a light emitting diode (LED) light source.

In some embodiments, the display light 356 may be in-coupled and out-coupled on the same side of the waveguide 304. In other words, the display light 356 may be in-coupled on the user side of the waveguide 304. In other embodiments, the display light 356 may be in-coupled and out-coupled on opposite sides of the waveguide 304. For example, the waveguide 304 may function light a periscope, receiving light on a first side away from a user, reflecting the light through the waveguide, and directing the light out of the waveguide on a second side toward a user.

The light engine 306 may further include relay optics 352, such as a collimator, focusing lenses, mirrors, scanning mirrors, or other optical elements to transmit the display light 356 to a scanner 354. For example, the relay optics may include one or more microelectromechanical system (MEMS) mirrors to create an image from the display light 356 provided by the laser light source 350. The image generated by the display light 356 may be transmitted to the scanner 354 with an input pupil. The scanner 354 may, in turn, scan the display light 356 (and input pupil 338) through a scan trajectory 358 along the lateral width (i.e., the first diffractive optical element width 334 of FIG. 5) of the first diffractive optical element 330.

In some embodiments, the scanner 354 may scan the display light 356 through the scan trajectory 358 continuously to scan the input pupil 338 across the first diffractive optical element 330. The actively out-coupled eyebox 360 is shown in solid lines in FIG. 6, with previous positions of the continuous scanned eyebox 360 shown in dashed lines. For example, the scanner 354 may scan the display light 356 in an alternating path, oscillating along the lateral width of the first diffractive optical element 330. In other words, the scanner 354 may direct display light along the lateral width of the first diffractive optical element 330 while the light is continuously provided to the first diffractive optical element 330 left-to-right, right-to-left, and so forth. In other examples, the scanner 354 may successively scan the display light 356 across the lateral width of the first diffractive optical element 330 in a single scan direction without oscillation. In other words, the scanner 354 may direct display light along the lateral width of the first diffractive optical element 330 while the light is discontinuously provided to the first diffractive optical element 330 in a series of left-to-right (or right-to-left) passes of the scanner 354.

In some embodiments, the scan trajectory 358 may be centered in the lateral center of the first diffractive optical element 330. In other embodiments, the scan trajectory 358 may be positioned away from the lateral center of the first diffractive optical element 330. The scan trajectory 358 may have a maximum angular sweep in a range having an upper value, a lower value, or upper and lower values including any of 30°, 45°, 60°, 90°, 120°, 150°, or any values therebetween. In some examples, the scan trajectory 358 may have a maximum angular sweep greater than 30°. In other examples, the scan trajectory 358 may have a maximum angular sweep less than 150°. In yet other examples, the scan trajectory 358 may have a maximum angular sweep between 30° and 150°. In further examples, the scan trajectory 358 may have a maximum angular sweep between 45° and 120°. In at least one example, the scan trajectory 358 may have a maximum angular sweep of about 120°.

The scanner 354 may direct the input pupil 338 of the display light 356 at a plurality of lateral positions along the lateral width of the first diffractive optical element 330. At each lateral position, the first diffractive optical element 330 may in-couple the display light 356 into the waveguide 304, which may direct the light internally toward the second diffractive optical element 342. In some embodiments, one or more in-coupling elements (prisms, SRG, etc.) of the first diffractive optical element 330 may be oriented at a compound angle relative to surface of the waveguide 304 to in-couple the display light 356 and direct the display light 356 toward the second diffractive optical element 342. For example, the scanner 354 may scan the display light across the first diffractive optical element 330 such that the display light 330 arrives at the first diffractive optical element 330 at a variety of incident angles 357.

In some embodiments, the first diffractive optical element 330 may have one or more in-coupling elements that are oriented in a first direction toward the scanner to compensate for the incident angle 357. The one or more in-coupling elements may each be oriented additionally in a second direction toward the second diffractive optical element 342 to direct the display light 356 toward the second diffractive optical element 342. In some examples, the in-coupling elements of the first diffractive optical element 330 may have a continuously changing first direction angle to compensate for the continuously changing incident angle 357 of the scanned display light 356 along the lateral width of the first diffractive optical element 330. In other examples, the in-coupling elements of the first diffractive optical element 330 may have a discretely changing first direction angle to approximately compensate for the continuously changing incident angle 357 of the scanned display light 356 along the lateral width of the first diffractive optical element 330.

The second diffractive optical element 342 may replicate the display light in a direction orthogonal to the lateral direction of the first diffractive optical element 330 to create a "one-dimensional eyebox" 360. For example, and for the ease of description, the scan direction may be the x-direction of the waveguide 304 and the replication direction may be the y-direction of the waveguide 304. The replication in the y-direction of the pupil scanned in the x-direction may create a composite eyebox to present the out-coupled display light to a user. In other words, the one-dimensional eyebox 360 may sweep across the second diffractive optical element 360 to simulate a two-dimensional expansion of a conventional eyebox.

Figure 7:
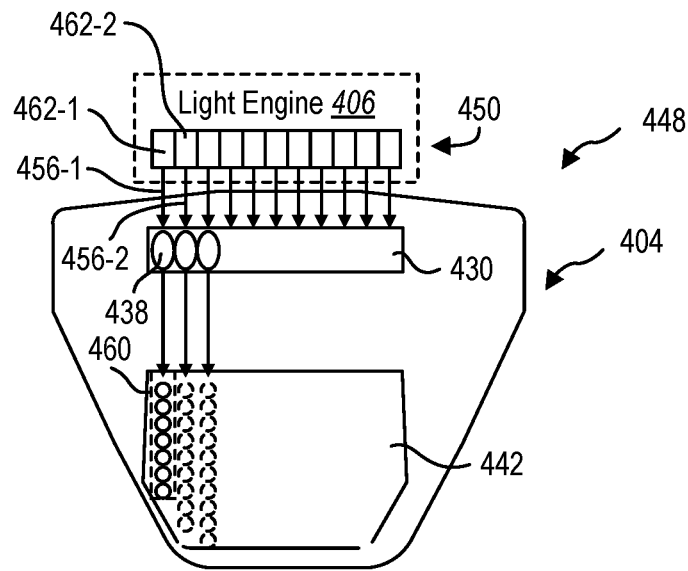
FIG. 7 is a schematic representation of another display system with continuous scanning, according to at least one embodiment of the present disclosure.

In other embodiments, a light engine may include a light source with a plurality of subsources, each of which may positioned at or in optical communication with a lateral position along the first optical diffraction element. FIG. 7 illustrates an embodiment of a display system 448 with the waveguide 404 of FIG. 5 and a light engine 406 with a light source 450 with a plurality of subsources 462-1, 462-2. In some embodiments, each subsource 462-1, 462-2 may be an image-generating subsource. The subsources 462-1 462-2 may each be laser light sources, LED light sources, laser diodes, or other light sources that are each configured to provide a display light 456-1, 456-2 to a different lateral position along the lateral width of the first diffractive optical element 430. In some embodiments, each of the subsources 462-1, 462-2 may be a light source that may direct a display light 456-1, 456-2 to the first diffractive optical element 430 without intervening relay optics. In other embodiments, at least one of the subsources 462-1, 462-2 may have relay optics to relay the display light 456-1, 456-2 to the first diffractive optical element 430.

In the illustrated embodiment, the light source 450 may include at least a first image-generating subsource 462-1 and a second image-generating subsource 462-2. The first image-generating subsource 462-1 may be configured to provide a first display light 456-1 to a first lateral position of the first diffractive optical element 430. The second image-generating subsource 462-2 may be configured to provide a second display light 456-2 to a second lateral position of the first diffractive optical element 430. Each input pupil 438 may be subsequently replicated by the second diffractive optical element 442 in a one-dimensional eyebox 460. By sequentially activating the subsources 462-1, 462-2, the light engine 406 may "scan" the display lights 456-1, 456-2 across the lateral width of the first diffractive optical element 430.

In other embodiments, two of more of the subsources 462-1, 462-2 may be activated simultaneously. For example, all of the subsources 462-1, 462-2 may be activated simultaneously to provide display light 456-1, 456-2 across a full lateral width of the first diffractive optical element 430. In other examples, two subsources 462-1, 462-2 may be activated simultaneously, such that two neighboring subsources 462-1, 462-2 are active at any time. In a specific example, the activation sequence of the subsources 462-1, 462-2 may include activating the first subsource 462-1 and subsequently activating the second subsource 462-2 before deactivating the first subsource 462-1 such that the activating periods of the first subsource 462-1 and second subsource 462-2 temporally overlap. The activation sequence may continue in such a fashion across the light source 450 with each subsequent subsource being activate before the previous subsource is deactivated.

Figure 8:
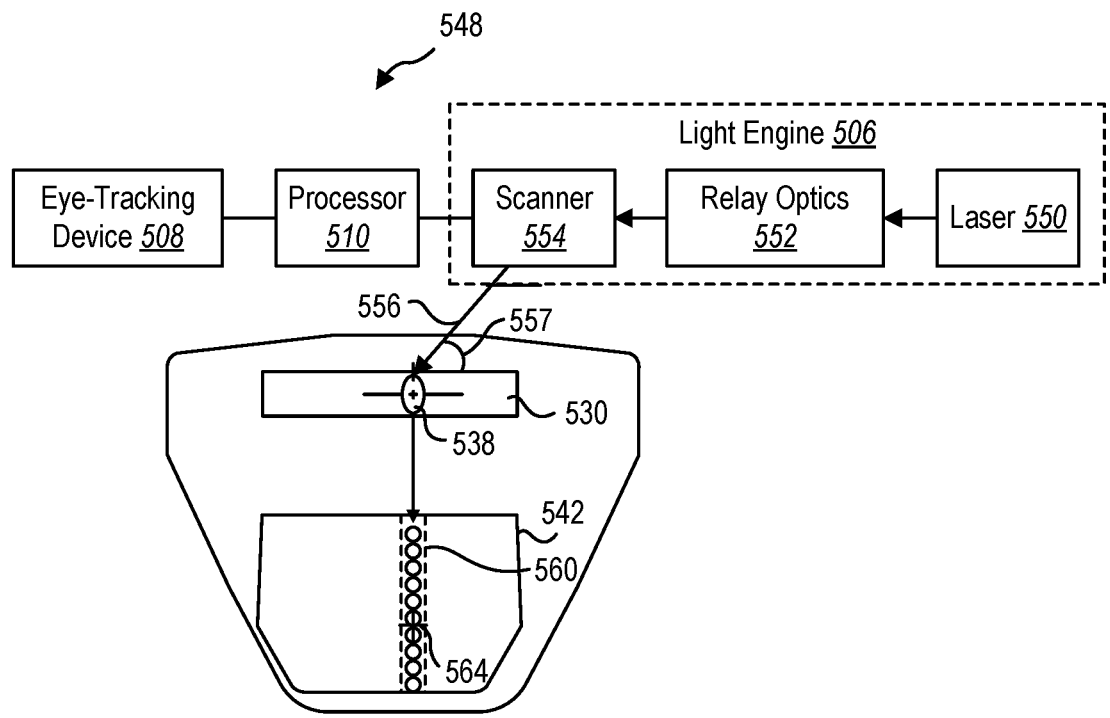
FIG. 8 is a schematic representation of a display system with discrete scanning, according to at least one embodiment of the present disclosure.

In other embodiments, a display system may be more power efficient by only providing display light to the region of the second diffractive optical element at which the user is looking. FIG. 8 is a schematic representation of an embodiment of a display system 548 including a waveguide 504, a light engine 506 in optical communication with the waveguide 504, and an eye-tracking device 508 and processor 510 in data communication with the light engine 506. As described herein, the light engine 506 may include a laser light source 550 or other light source that provides a display light 556 through relay optics 552 to a scanner 554. In some embodiments, the scanner 554 may not continuously scan the display light 556 across a lateral width of the first diffractive optical element 530. The scanner 554 may, instead, direct the display light 556 at a first lateral position of the first diffractive optical element 530 at least partially based upon a detected pupil position 564. In some embodiments, the lateral position of the input pupil 538 may be continuously variable along the lateral width of the first diffractive optical element 530, similar to the scanner 354 described in relation to FIG. 6.

As described herein, the in-coupling elements of the first diffractive optical element 530 may have a discretely changing first direction angle. In some embodiments, the scanner 554 may direct the display light 556 along the lateral width of the first diffractive optical element 530 in discrete steps. The discrete changes in the first direction of the in-coupling elements of the first diffractive optical element 530 may compensate for the discrete steps in the incident angle 557 of the directed display light 556 along the lateral width of the first diffractive optical element 530.

In some embodiments, the pupil position 564 may be detected by the eye-tracking device 508 and communicated to the processor 510. In some examples, the eye-tracking device 508 may detect only the lateral position (x-position) of the pupil position 564. In other examples, the eye-tracking device 508 may detect the vertical position (y-position) and the lateral position (x-position) of the pupil position 564. The processor 510 may instruct the scanner 554 to direct the display light 556 to a lateral position on the first diffractive optical element 530 that corresponds to the lateral position of the pupil position 564. In other words, the processor 510 may instruct the scanner 554 to direct the display light 556 such that the second diffractive optical element 542 out-coupled the light in a one-dimensional eyebox 560 where the user is looking at the pupil position 564. Therefore, the display system 548 may only illuminate the lateral position of the second diffractive optical element 542. When the eye-tracking device 508 detects the pupil position 564 moves to a second lateral position, the scanner 554 may direct the display light 556 to a second lateral position on the first diffractive optical element 530 to provide the display light at the second pupil position.

In another embodiment, a display system 648 according to the present disclosure may include a waveguide 604, a light engine 606 with a light source 650 having a plurality of subsources 662-1, 662-2 in optical communication with the waveguide 604, and an eye-tracking device 608 and processor 610 in data communication with the light engine 606.

The light engine 606 may direct display light 656 at a first lateral position of the first diffractive optical element 630 at least partially based upon a detected pupil position 664. In some embodiments, the lateral position of the input pupil 638 may be discretely stepped along the lateral width of the first diffractive optical element 630. Because the display light 656 is may be provided directly to the first diffractive optical element 630 by each of the subsources 662-1, the in-coupling elements of the first diffractive optical element 630 may not need a compound angle, rather in-coupling the display light 656 along the axis of the display light 656 toward the second diffractive optical element 642. The display light 656 may then be out-coupled by the second diffractive optical element 642 in a one-dimensional eyebox 660 positioned at the lateral position of the pupil position 664.

Figure 9:
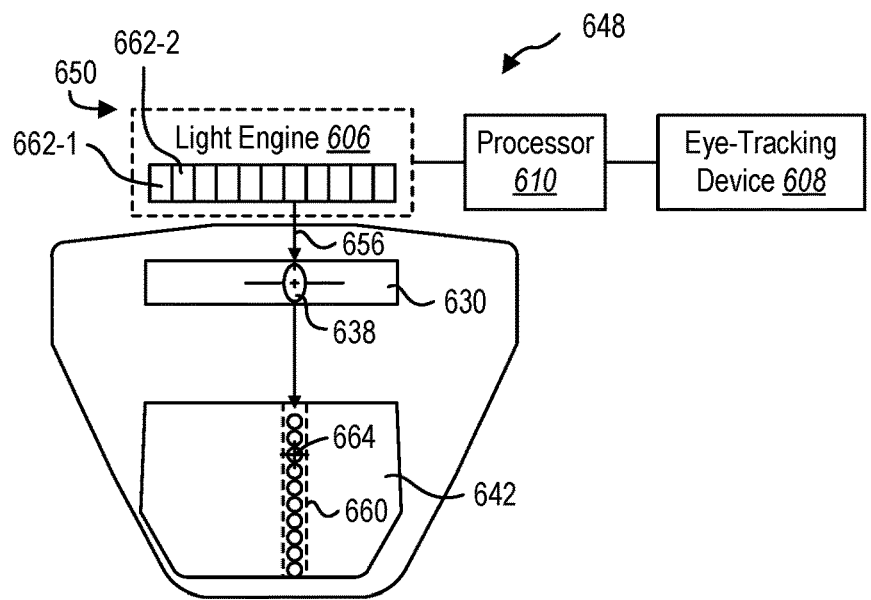
FIG. 9 is a schematic representation of another display system with discrete scanning, according to at least one embodiment of the present disclosure.
Figure 10:
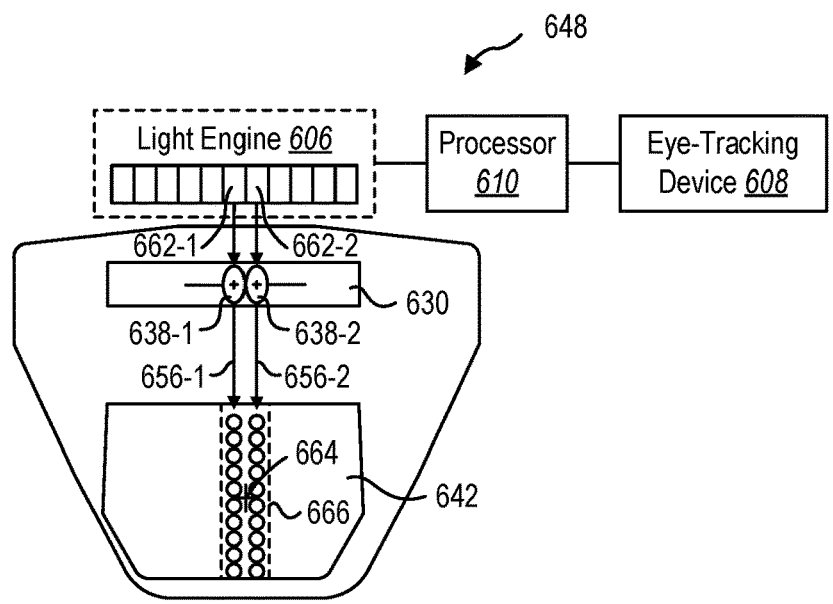
FIG. 10 is a schematic representation of the display system of FIG. 9 with discrete scanning in a plurality of lateral locations, according to at least one embodiment of the present disclosure.

FIG. 10 illustrates an embodiment of the display system 648 of FIG. 9 with a pupil position 664 that is between two discrete lateral positions of the light engine 606 and/or the first diffractive optical element 630. The eye-tracking device 608 may detect the pupil position 664 and provide the pupil position 664 to the processor 610. The processor 610 may then activate a plurality of subsources 662-1, 662-2 of the light engine 606. The first subsource 662-1 may provide a first display light 656-1 at a first input pupil 638-1, and the second subsource 662-2 may provide a second display light 656-2 at a second input pupil 638-2 adjacent to and/or overlapping with the first input pupil 638-1. The first display light 656-1 and second display light 656-2 may be out-coupled by the second diffractive optical element 642 in a two-dimensional eyebox 666 such that the pupil position 664 is overlapped by the two-dimensional eyebox 666.

In at least one embodiment, a display system according to the present disclosure may allow for more reliable image reproduction, lower energy consumption, smaller packaging, and more flexible design options relative to a display system with a waveguide with multi-dimension pupil expansion.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A display system, the system including:
   a selectively directable light source configured to provide a display light at an input pupil having a pupil height and pupil width, wherein the selectively directable light source is configured to selectively direct the display light to move a location of the input pupil; and
   a waveguide configured to receive the display light from the input pupil and transmit the display light to an eyebox with an eyebox height and an eyebox width, the waveguide including:
      a first diffractive optical element configured to in-couple the display light into the waveguide, the first diffractive optical element having a first diffractive optical element height that is at least the pupil height and a first diffractive optical element width that is at least the eyebox width, and
      a second diffractive optical element configured to out-couple the display light from the waveguide, the second diffractive optical element having a second diffractive optical element height that is the eyebox height and a second diffractive optical element width that is the eyebox width.

2. The system of claim 1, the first diffractive optical element including an in-coupling element with a compound angle relative to a surface of the waveguide.

3. The system of claim 2, the compound angle changing based on a position of the in-coupling element along the first diffractive optical element width.

4. The system of claim 3, the selectively directable light source configured to move the location of the input pupil in a plurality of discrete steps along the first diffractive optical element width and the compound angle changing in a plurality of discrete steps along the first diffractive optical element width to compensate for the discrete steps of the selectively directable light source.

5. The system of claim 3, the selectively directable light source configured to move the location of the input pupil in a continuously variable position along the first diffractive optical element width and the compound angle changing continuously along the first diffractive optical element width to compensate for the continuously variable position of the selectively directable light source.

6. The system of claim 3, the in-coupling element being a surface relief grating.

7. The system of claim 1, selectively directable light source further comprising a plurality of subsources positioned laterally along the first diffractive optical element width.

8. The system of claim 1, the selectively directable light source including a laser light source.

9. The system of claim 1, the selectively directable light source including a scanner configured to continuously scan the display light across the first diffractive optical element width.

10. The system of claim 9, the scanner having a maximum angular sweep of 150°.

11. A display system, the system including:
    an eye-tracking device configured to measure a gaze position of a user's eye;
    a selectively directable light source configured to provide a display light at an input pupil having a pupil height and pupil width, the light source being selectively directable based on the gaze position, wherein the selectively directable light source is configured to selectively direct the display light to move a location of the input pupil; and
    a waveguide configured to receive the display light and transmit the display light, the waveguide including:
       a first diffractive optical element configured to in-couple the display light into the waveguide, the first diffractive optical element having a first diffractive optical element height that is at least the pupil height and a first diffractive optical element width that is at least five times the pupil height, and
       a second diffractive optical element configured to out-couple the display light from the waveguide in a one-dimensional eyebox.

12. The system of claim 11, the selectively directable light source including a plurality of light sources at discrete positions along the first diffractive optical element width.

13. The system of claim 11, the selectively directable light source including at least one movable optical element to direct light from a light source to a lateral position along the first diffractive optical element width.

14. The system of claim 11, the display light being perpendicular to the waveguide surface across the first diffractive optical element width.

15. The system of claim 11, the selectively directable light source including a laser light source with an emission spectrum width of less than 2 nanometers.

16. A method of providing visual information to a user, the method including:
    in-coupling a display light into a waveguide at an input pupil having a first lateral position along a first diffractive optical element;
    reflecting the display light in a first path within the waveguide to a second optical element; and
    out-coupling the display light in a first one-dimensional eyebox; and
    selectively directing the display light at an input pupil having a second lateral position along the first diffractive optical element.

17. The method of claim 16, further comprising selectively directing the display light at a second lateral position along the first diffractive optical element using a microelectromechanical system mirror.

18. The method of claim 16, further comprising:
in-coupling the display light into the waveguide at the input pupil location having the second lateral position along the first diffractive optical element;
reflecting the display light in a second path parallel to the first within the waveguide to the second optical element; and
out-coupling the display light in a second one-dimensional eyebox.

19. The method of claim 18, out-coupling the display light in a first one-dimensional eyebox and out-coupling the display light in a second one-dimensional eyebox temporally overlapping such that the first one-dimensional eyebox and the second one-dimensional eyebox are adjacent and form a two-dimensional eyebox.

20. The method of claim 16, further comprising measuring a lateral gaze position of a user's eye and directing the display light to an input pupil location at the lateral gaze position.

* * * * *